US008434062B2

United States Patent
Gawor et al.

(10) Patent No.: US 8,434,062 B2
(45) Date of Patent: Apr. 30, 2013

(54) ENHANCING SOURCE CODE DEBUGGING AND READABILITY USING VISUAL SYMBOLS

(75) Inventors: Jaroslaw Gawor, Apex, NC (US); Paul F. McMahan, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 12/142,315

(22) Filed: Jun. 19, 2008

(65) Prior Publication Data
US 2009/0319995 A1  Dec. 24, 2009

(51) Int. Cl.
*G06F 9/44* (2006.01)
(52) U.S. Cl.
USPC ............ 717/113; 717/110; 717/109; 717/106
(58) Field of Classification Search .................. 717/113, 717/110, 109, 106
See application file for complete search history.

(56) References Cited

U.S. PATENT DOCUMENTS 6,083,278 A * 7/2000 Olson et al. .................... 717/113
6,993,759 B2 * 1/2006 Aptus et al. .................... 717/170

OTHER PUBLICATIONS

Lommerse, et al. "The Visual Code Navigator: An Interactive Toolset for Source Code Investigation", 2005, IEEE, p. 25-32.*

* cited by examiner

*Primary Examiner* — Qamrun Nahar
(74) *Attorney, Agent, or Firm* — Brian J. Teague (57) ABSTRACT

The present invention provides the ability to enable a special view of source code in which the textual name of classes, variables, methods and object instances can be replaced with graphical symbols. A method of displaying computer source code according to the present invention comprises assigning unique graphical symbols to a plurality of corresponding textual names of source code classes, methods, and variables, replacing the plurality of textual names of the classes, methods, and variables with the corresponding assigned unique graphical symbols, and displaying the source code with the unique graphical symbols in place of the corresponding textual names of the classes, methods, and variables.

18 Claims, 7 Drawing Sheets

FIG. 1

```
public class Foo {                                          ⟋30a
          ⟋31a
    Foo[ ] parents = new Foo[10];
    String name ;
          ⌞32a      ⟋33a
    public Foo(String name ) {
        this. name = name ;
    }     32a⌟    33a⌟
                              ⟋34a    ⟋35a         ⟋36a
    public Foo getParent (String name , int index , Map parameters ) {
          ⟋37a           ⟋34a
        Foo parent = new Foo( name );
          ⟋34a            ⟋32a
        if ( name .equals( this.name )) {
            parent = parents [0];
        } 37a⌟           ⌞31a
                ⟋35a     ⟋31a
        else if ( index == parents .length) {
        parent = parents [1];
        }  ⌞37a       ⌞31a else {                              ⟋36a
        String nameParameter = (String) parameters .get("name");
        this. name = nameParameter ;
        }       ⌞32a return parent;
    }          ⌞37a
}
```

FIG. 2
(PRIOR ART)

```
public class Foo {                                          ⎽⎽30b
    Foo[ ] ▭ = new Foo[10];          ⎽31b
    String ◇ ;
           32b
    public Foo(String △ ) {
                    33b
        ◇ = △
        32b  33b
    } public Foo getParent (String ◯, int ⬠, Map ⌼ ) {
                               34b    35b      36b
        Foo ☆ = new Foo( ◯ );
            37b           34b
        if ( ◯ .equals( ◇ )) {
             34b        32b
            ☆ = ▭[0] ;
            37b 35b 31b
        else if ( ⬠ == ▭ . length) {
            ☆ = ▭[1];
            37b 31b
        }
        else {
            String nameParameter = (String) [ ⌼ .get("name")
                                              36b
            ◇ = nameParameter
            32b
        }
        return ☆ ;
               37b
    }
}
```

FIG. 3

```
public class Bar { public Bar(String name1, String name2) {

Foo foo1 = new Foo ( name1 );
        Foo foo2 = new Foo ( name2 );

foo1.parents[0] = foo2;

int i = 0;
        Map params = Collections.EMPTY_MAP;
        foo1.getParent( name1 , i , params );
    }
}
```

46a  48a  50a

```
public Foo getParent (String name , int index , Map parameters ) {
    Foo parent = new Foo( name );
    if ( name .equals( this.name )) {
        parent = parents [0];
    }
    else if ( index == parents .length) {
        parent = parents [1];
    }
    else {
        String nameParameter = (String) parameters .get("name");
        this. name = nameParameter ;
    } return parent;
}
```

FIG. 4
(PRIOR ART)

```
public class Bar {                                          ⟋40b public Bar(String name1, String name2) {

Foo foo1 = new Foo ( name1 );
        Foo foo2 = new Foo ( name2 );

foo1.parents[0] = foo2;

int i = 0;
        Map params = Collections.EMPTY_MAP;
        foo1.getParent( ◇ , ◯ , ☆ );
                       46b  48b  50b
    }

}
```

42b {

```
public Foo getParent ( String ◇, int ◯ , ☆ ) {
                              46b    48b  50b
    Foo parent = new Foo( ◇ );
                         46b
    if ( ◇ .equals( this.name )) {
         46b
        parent = parents [0];
    }
    else if ( ◯ == parents .length) {
              48b
        parent = parents [1];
    }
    else {
        String nameParameter = (String) ☆ .get("name");
                                        50b
        this. name = nameParameter ;
    } return parent;
}
```

ENHANCING SOURCE CODE DEBUGGING AND READABILITY USING VISUAL SYMBOLS

BACKGROUND

The present invention relates to displaying software code, and more particularly, to enhancing the readability of displayed software code.

Computer programs are conventionally written in a high-level language, often in an object-oriented programming language. An object-oriented programming language is a programming language in which programs are created using objects and their interactions to design applications and computer programs. As used with respect to computer systems, the term "object" represents an encapsulated set of data and the method or a group of methods that are performed by a computer system upon that data. An object is an instance of a class. An instance is a named entity that has its own identity and value. An object's identity is the property that uniquely identifies that object, such as a unique object ID number.

A class is a description of a set of entities that share the same attributes, methods, and relationships. Each class has a definition that comprises a data definition and a method definition. Data definitions define the information controlled by the object, and method definitions define the method or methods of such objects.

Objects and classes are created through writing source code. A source code is a human-readable program containing statements written in a high-level language that is not directly readable by a computer. A source code cannot be used by a computer unless it has been compiled. A compiler is a computer program that converts ("compiles") source code into machine language. The machine code generated is directly executed by the computer's central processing unit.

Many computer programs are written in separate modules, especially when written by a team of developers. Object code modules are linked together to form an executable program.

Software code often contains errors. The process of eliminating errors during software development is commonly known as debugging. Debugging can be quite costly and time consuming, depending on the complexity of the software being developed. Some of these errors are easily detected by visual inspection of the printed code. More subtle errors are typically only discovered with the help of a software debugging tool ("debugger"). A debugger is typically used to trace the execution of executable code for finding programming errors (bugs). Debuggers typically enable a software developer to set a breakpoint near a possibly flawed section of code, run the program normally until the present breakpoint is reached, and then run the program step-by-step (single-stepping) through the possibly flawed section of code to evaluate the cause of the problem.

Software development and debugging is typically performed using an integrated development environment (IDE). An IDE typically comprises a source code editor, a compiler and/or interpreter, build automation tools, and a debugger.

Because many different developers and organizations may be involved in the software development process, software development can be difficult and complex. For example, different portions of the source code of a typical software project may be stored on different computers and in different computer directories. Different software languages may be used to write different portions of the code. It is very important for software developers and support engineers to be able to quickly analyze source code with which they are unfamiliar. Reading and conceptualizing the objects in source code requires a great deal of effort because it requires the reader to translate letters and numbers into a mental representation.

One known solution is for the source code editor or viewer to apply colors, fonts, and styles to the source code using a stylesheet or template system. This could for example make all instance variables a certain color and font, all method names another color and font, and so on. This solution still requires the reader to engage a good portion of his/her mind in reading words and translating those words into mental concepts. Further, this solution applies color, fonts, and styles to types of entities rather than specific entities.

Another known solution is for the IDE such as Symantec's Visual Cafe to provide a visual programming environment where a program can be created from a collection of "widgets" that are arranged graphically in a canvas, and the behaviors of those widgets are defined in properties dialogs. The drawback of this solution is that within this type of view the reader is not examining the objects that are represented by the widgets within the context of the source code itself, so the comments, flow control, and many other types of meaningful information are obscured. It is usually necessary for the reader to toggle back and forth between the visual and source code views to comprehend the source code.

BRIEF SUMMARY

The present invention provides the ability to enable a special view of source code in which the textual name of classes, variables, methods and object instances can be replaced with graphical symbols.

In one embodiment of the invention, a method of displaying computer source code is provided, the source code comprising one or more classes, methods, and variables having textual names, the method comprising assigning unique graphical symbols to a plurality of corresponding textual names of the classes, methods, and variables, replacing the plurality of textual names of the classes, methods, and variables with the corresponding assigned unique graphical symbols, and displaying the source code with the unique graphical symbols in place of the corresponding textual names of the classes, methods, and variables. The assigning may be performed by a user or automatically.

The source code may comprise at least a first and a second module, the method may be implemented during debugging of the source code, and the unique graphical symbols may be assigned to the corresponding textual names of the variables present in the first module. In such a situation, the method may further comprise passing the unique symbol assigned to each unique variable from the first module to the second module when each unique variable is passed from the first module to the second module. The symbol is passed from the first module to the second module regardless of whether the name of the variable in the second module is the same as the name of the corresponding variable in the first module. As such, the second module is displayed with the assigned unique graphical symbols in place of the textual names of the variables.

The method may further comprise exporting a mapping of the assigned unique graphical symbols and each respective textual name to a central repository. A voting system may be provided whereby users of the central repository can rate the unique graphical symbols.

The method may further comprise importing a mapping of the assigned unique graphical symbols and each respective textual name from a central repository, wherein the assigning is performed based on the imported mapping.

Each assigned graphical symbol may comprise a color indicative of a property of the corresponding class, method, or variable.

In addition to the method of displaying computer source code, as described above, other aspects of the present invention are directed to corresponding systems and computer program products for displaying computer source code.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
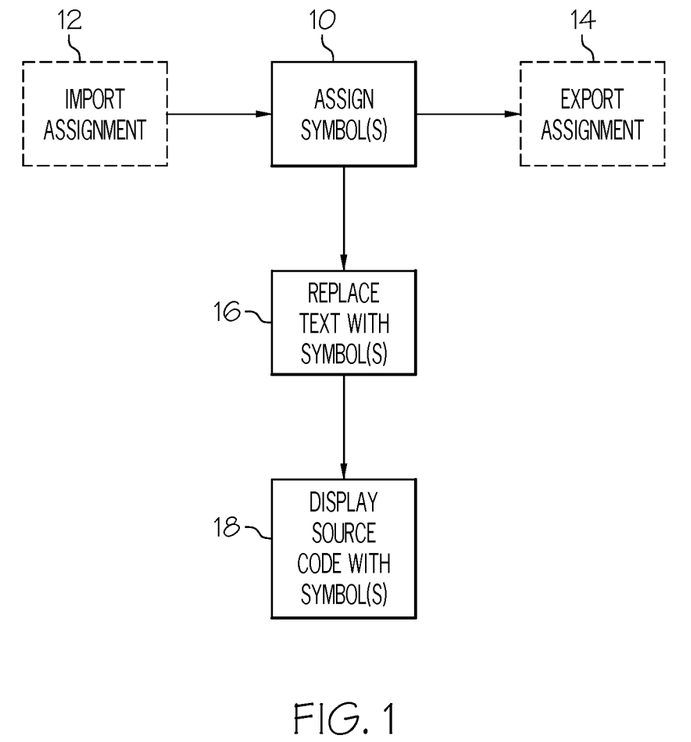
FIG. 1 is a flowchart of the operation of a method of displaying computer source code, in accordance with one embodiment of the present invention.

This invention provides a view of computer program source code in which the textual name of classes, variables, and methods can be replaced with symbols, which may be selected and assigned by a user or automatically. Embodiments of the invention may be implemented in an IDE. Referring now to FIG. 1, a flowchart of the operation of a method of displaying computer source code is illustrated in accordance with one embodiment of the present invention. While creating or examining source code using the IDE in which embodiments of the invention are implemented, the user can highlight a particular textual representation of a class, variable, or method and select a graphical symbol from the user's personal archive or an online archive to be assigned to that textual representation (block 10). The user may only need to highlight and select a symbol for one instance of any particular textual representation, which will then enable the invention to replace all instances of that particular textual representation with the assigned symbol. In other words, the user does not need to highlight and select all instances of a particular textual representation in order for the invention to replace all instances of that particular textual representation with the assigned symbol.

In different embodiments of the invention, the assignment of the symbols to the textual representations of classes, variables, and/or methods can be performed in different ways. In one embodiment, the user may, one-by-one, select each textual representation which the user desires to have displayed as a symbol and select a different symbol to be assigned to each textual representation. If the user is assigning the symbols, the IDE verifies that any one symbol is not being assigned to multiple different textual representations. In another embodiment, the user may select each textual representation which the user desires to have displayed as a symbol and instruct the IDE to automatically select a different symbol to be assigned to each textual representation. In this embodiment, the user may select textual representations to be replaced by symbols one-by-one and instruct the IDE to select a symbol after each user selection, or the user may select all of the textual representations to be replaced by symbols and then instruct the IDE to select symbols for all of the selected textual representations. In yet another embodiment, the user may simply instruct the IDE to identify all textual representations of classes, variables, and/or methods and automatically select a different symbol to be assigned to each textual representation.

The assignment of particular symbols to particular textual representations may be imported from a central database of assignments (block 12). Such a central database may be established to, e.g., facilitate and encourage the use of standardized symbol assignments. The database may contain one or more mapping files, which in turn may contain: (1) the names of source code files; (2) the textual names of the classes, variables, and methods; and (3) online locations of the images used for symbols in the source code. Because some source code files may be widely accessed and used, predetermined assignments for particular source code files may be stored in the database. In such a case, the IDE may simply search the database for the name of the source code file for which symbols are to be assigned and receive from the database the stored, predetermined assignment information for that source code file. In other instances in which predetermined assignments are not stored in the database for the particular source code file, the IDE may need to search the database for particular textual names of classes, variables, and/or methods and receive from the database the stored assignment information for the searched textual names.

In some instances, the user may wish to export assignments (block 14) that were created at block 10 to a central database. For example, the user may be creating assignments for a widely used source code file for which the database does not already contain predetermined assignments. The IDE may export the assignments at the user's request by sending a mapping file to the central database. The mapping file may contain: (1) the name of the source code file(s); (2) the names of the classes, variables, and methods; and (3) the online locations of the images used for symbols in the source code. This aspect of the invention allows the community of developers and support engineers to share the symbols they use in their source code viewers. It is possible to take further advantage of this aspect of the invention, such as allowing the community to collectively decide which symbols are most useful or appropriate through a simple inline validation or voting system in their source code viewers.

After the graphical symbols have been assigned to corresponding textual names, either automatically or by user selection, the textual names are replaced by the assigned symbols (block 16). After that, the IDE will display the symbol in place of the class, variable, or method name when that source code file is displayed (block 18). The source code file with the textual names replaced by symbols may be displayed statically, or during a debug session when the developer is using the IDE to "step through" the source code. During a debug session, symbols can be assigned to instance variables so that as the user steps through various methods and classes the object is always represented uniformly as that symbol, instead of whatever textual name that a developer had originally chosen for it.

As discussed above, the software developer may be debugging source code that comprises multiple modules that were developed by different developers. This debugging can be especially challenging because a variable that is passed from one module to another may have different names in each of the different modules. These different names make it difficult for the developer to track the variables from one module to another. Advantageously, embodiments of the invention enable the unique symbol assigned to each unique instance variable to be passed from a first module (in which the symbol was assigned) to a second module when each unique instance variable is passed from the first module to the second module. This passing occurs regardless of whether the name of the instance variable in the second module is the same as the name of the corresponding instance variable in the first module. This enables the second module to be displayed with the same assigned unique graphical symbols in place of the textual names of the instance variables as in the first module.

Figure 2:
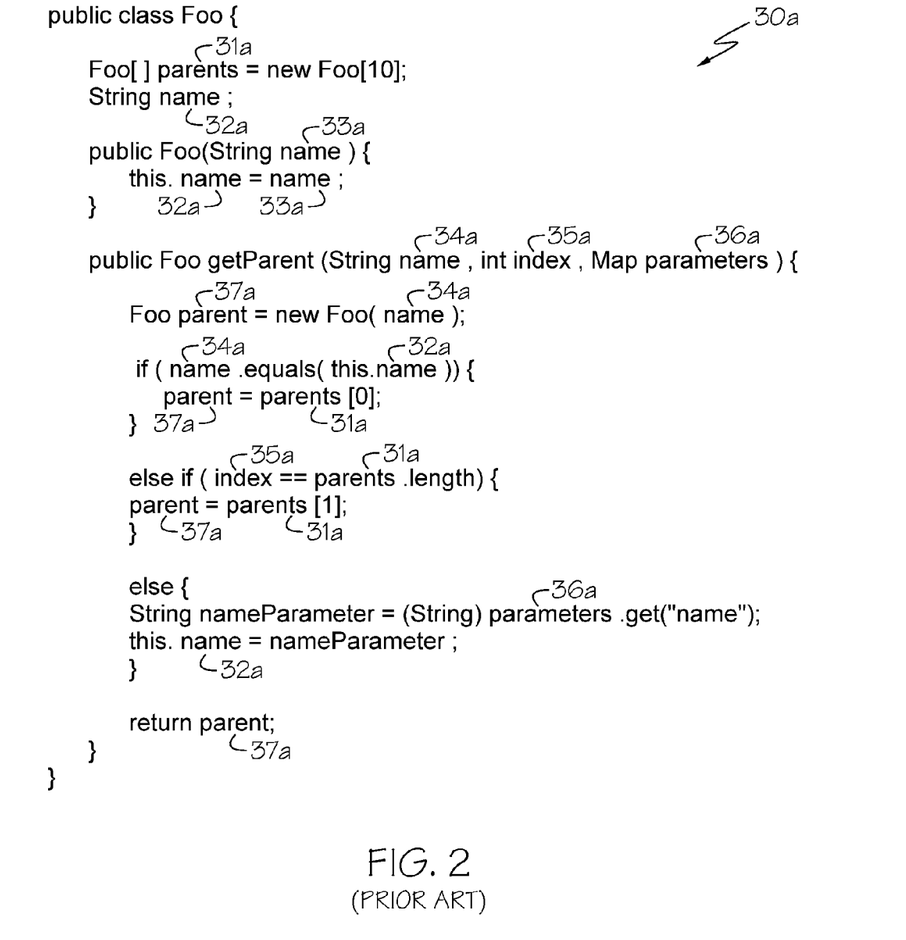
FIG. 2 illustrates Java source code as displayed during debugging, in accordance with prior art methods.

Referring now to FIG. 2 which illustrates a static display of Java source code in accordance with prior art methods, a source code module 30a is displayed with the textual names of the variables displayed as written by the developer. In FIG. 2, the textual name of the variable "parents" 31a is displayed; the textual name of the first variable called "name" 32a; the textual name of the second variable called "name" 33a is displayed, the textual name of the third variable called "name" 34a is displayed, the textual name of the variable "index" 35a is displayed, the textual name of the variable "parameters" 36a is displayed, and the textual name of the variable "parent" 37a is displayed. It should be noted that there are three different variables called "name" in this example code. In object-oriented programming, variable names only have to be unique within their scope. When a variable in the class scope and a variable in a method scope have the same name they are differentiated by placing "this" in front of the variable in the class scope. Having code with different variables that have the same textual name greatly increases the difficulty of understanding and debugging the code using prior art display methods.

Figure 3:
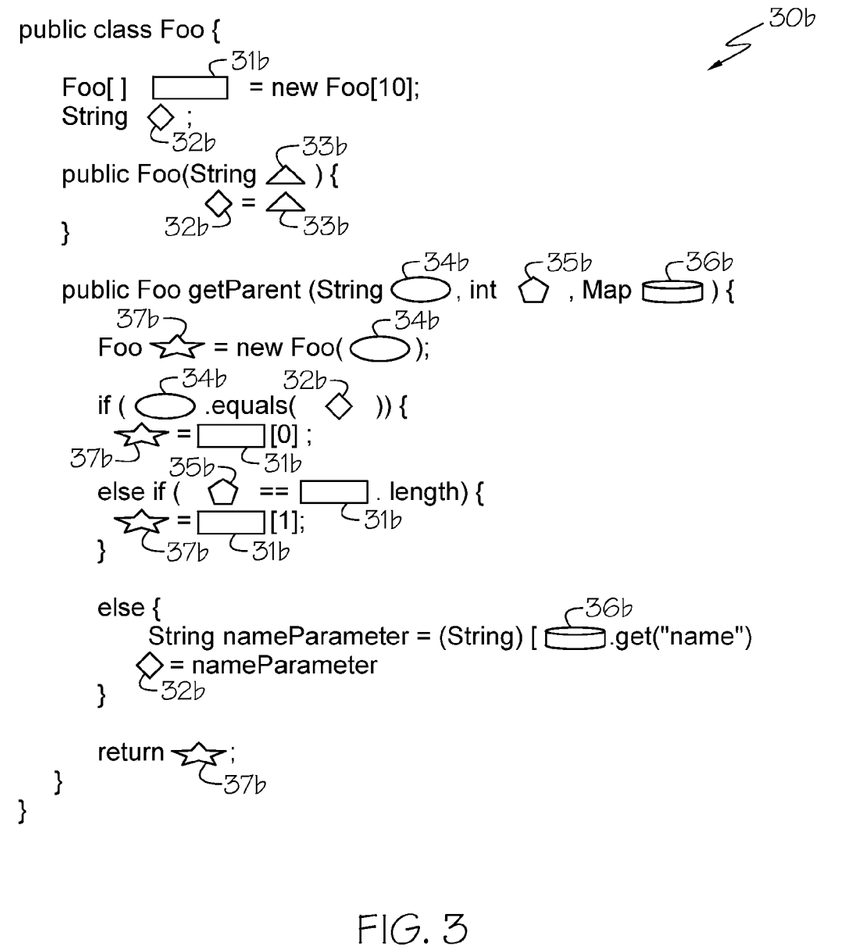
FIG. 3 illustrates the Java source code of FIG. 2 as displayed using embodiments of the present invention.

Referring now to FIG. 3, the same source code module 30b as illustrated in FIG. 2 is displayed with the textual names of the variables replaced with graphical symbols, in accordance with embodiments of the invention. In FIG. 3, the textual name of the variable "parents" has been replaced by the rectangle symbol 31b; the textual name of the first variable called "name" has been replaced by the diamond symbol 32b; the textual name of the second variable called "name" has been replaced by the triangle symbol 33b, the textual name of the third variable called "name" has been replaced by the oval symbol 34b, the textual name of the variable "index" has been replaced by the pentagon symbol 35b, the textual name of the variable "parameters" has been replaced by the cylinder symbol 36b, and the textual name of the variable "parent" has been replaced by the star symbol 37b. Although FIG. 3 illustrates only the replacement of the textual names of variable, embodiments of the invention also enable the replacement of the textual names of classes and methods.

Although not illustrated in FIG. 3, an assigned symbol may have different colors, with each different color representing a different property of the class/variable/method. For example, a blue color may mean there is no legal issue in the class or method, a green color may mean that the class/variable/method is recommended by the community to be good coding practice, a yellow color may mean the class/variable/method is error-prone or has frequent changes or bugs associated with it. Also not illustrated in FIG. 3, an assigned symbol may have an additional mark, symbol, or text on the symbol indicating additional information about the class/variable/method. For example, the symbol may contain the text "sub" to indicate that the associated object is a subtype or may contain the text "sup" to indicate that the associated object is a supertype.

Figure 4:
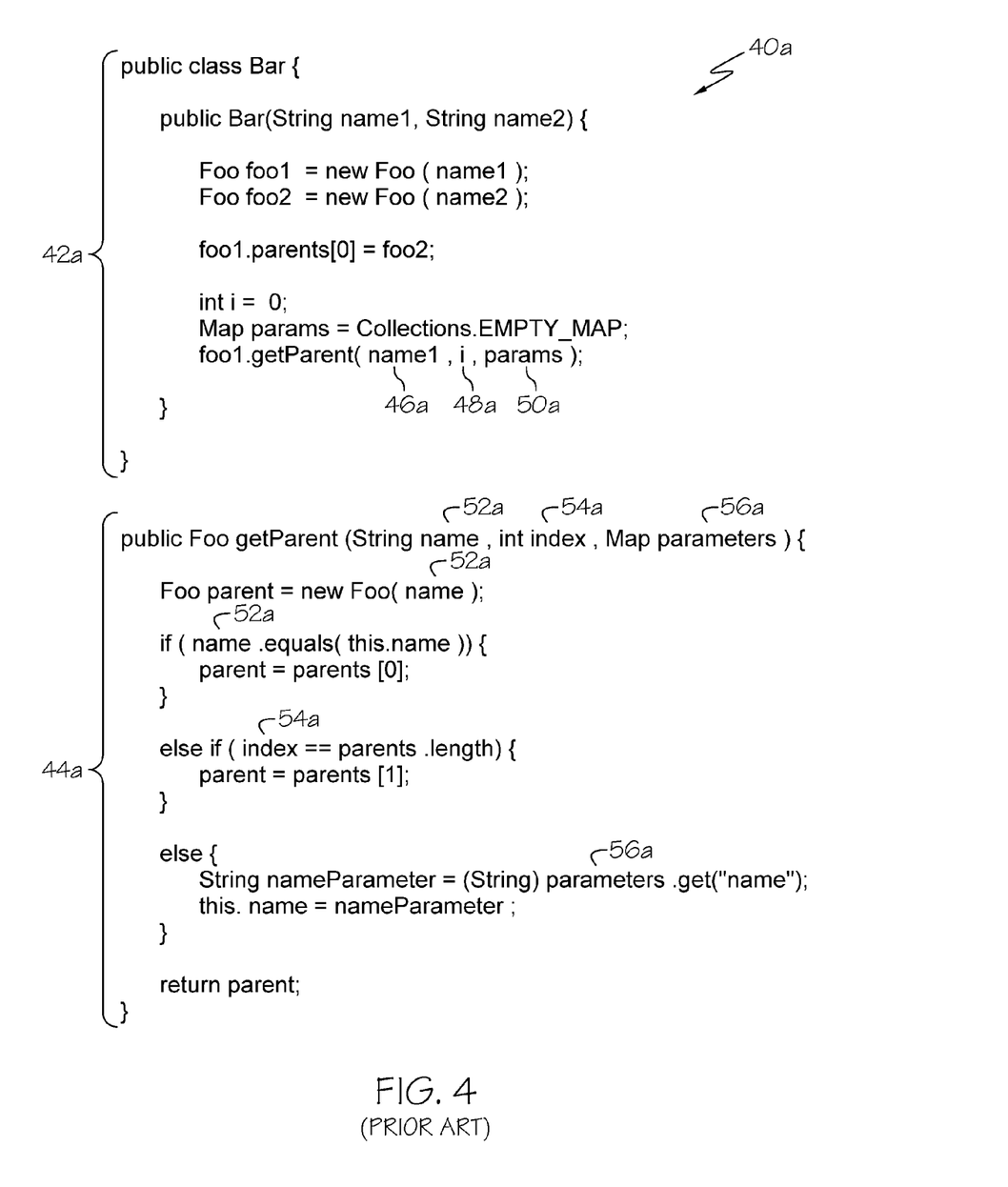
FIG. 4 illustrates two modules of Java source code as displayed during debugging, in accordance with prior art methods.

Referring now to FIG. 4 which illustrates the runtime display of two modules 42a, 44a of Java source code in accordance with prior art methods, source code 40a is displayed with the textual names of the instance variables displayed as written by two different developers. In the first module 42a of FIG. 4, the textual name of the variable called "name1" 46a is displayed, the textual name of the variable called "i" 48a is displayed, and the textual name of the variable called "params" 50a is displayed. While the same variables also exist in the second module 44a, the developer of the second module used different names for these variables. In the second module 44a, the textual name of the variable called "name1" 46a in the first module is now "name" 52a in the second module and is displayed as such, the textual name of the variable called "i" 48a in the first module is now "index" 54a in the second module and is displayed as such, and the textual name of the variable called "params" 50a in the first module is now "parameters" 56a in the second module and is displayed as such. As discussed above, this use of different names by different developers for the same variable is common but makes debugging the code more difficult.

Figure 5:
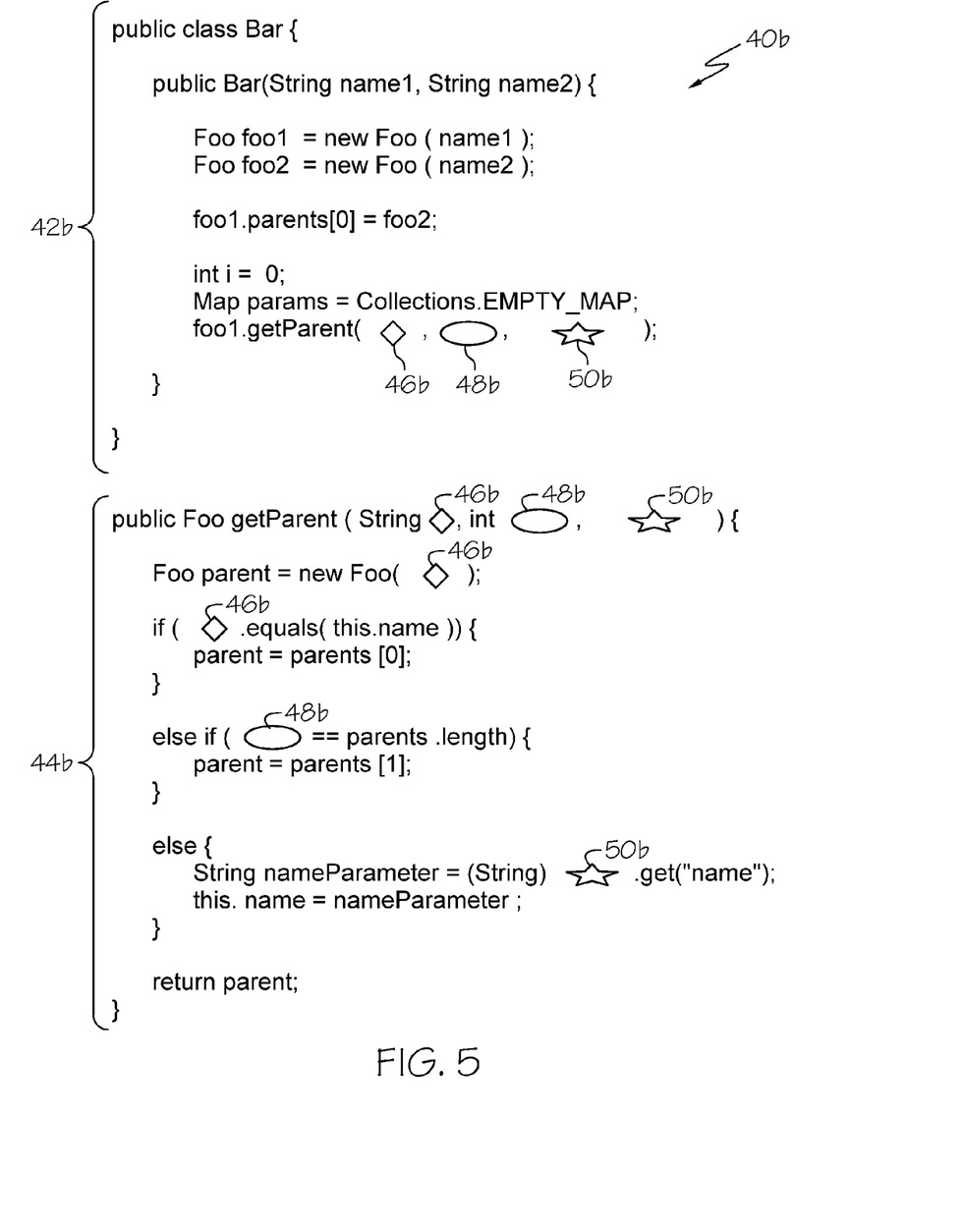
FIG. 5 illustrates the two modules of Java source code of FIG. 2 as displayed using embodiments of the present invention.

Referring now to FIG. 5, the same two modules 42b, 44b of source code 40b as illustrated in FIG. 4 are displayed with the textual names of the variables replaced with graphical symbols, in accordance with embodiments of the invention. In the first module of FIG. 5, the textual name of the variable called "name1" has been replaced by the diamond symbol 46b, the textual name of the variable called "i" has been replaced by the oval symbol 48b, and the textual name of the variable called "params" has been replaced by the star symbol 50b. In the second module of FIG. 5, the same symbols are displayed for the same variables, despite the different variable names used in the second module. Thus, in the second module, the textual name of the variable called "name" has been replaced by the diamond symbol 46b, the textual name of the variable called "index" has been replaced by the oval symbol 48b, and the textual name of the variable called "parameters" has been replaced by the star symbol 50b.

Figure 6:
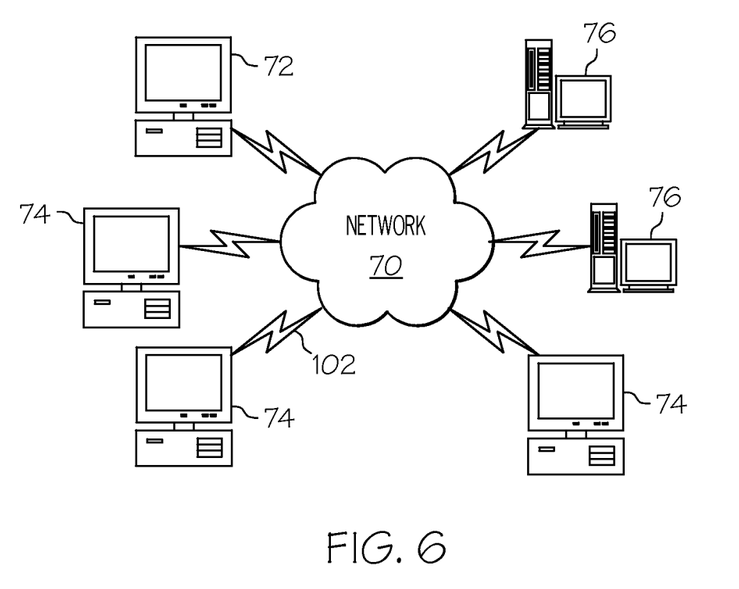
FIG. 6 is a schematic block diagram of a computer network in which embodiments of the present invention may operate.

FIG. 6 is a schematic block diagram of a computer network in which embodiments of the present invention may operate. Computers 72, 74 and servers 76 provide processing, storage, and input/output devices executing application programs and the like. Computers 72, 74 may be linked through communications network 70 to each other and to other computing devices, including servers 76. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In the system of FIG. 6, computer 72 is running an IDE on which a program is being debugged. Some modules of the program being debugged may reside on computer 72, some modules may reside on one or more of computers 74, and some modules may reside on one or more of servers 76. A central database that stores mappings of unique graphical symbols and respective textual names may reside on, e.g., server 76. Computers 72, 74 and servers 76 may be linked over any suitable communication network.

Figure 7:
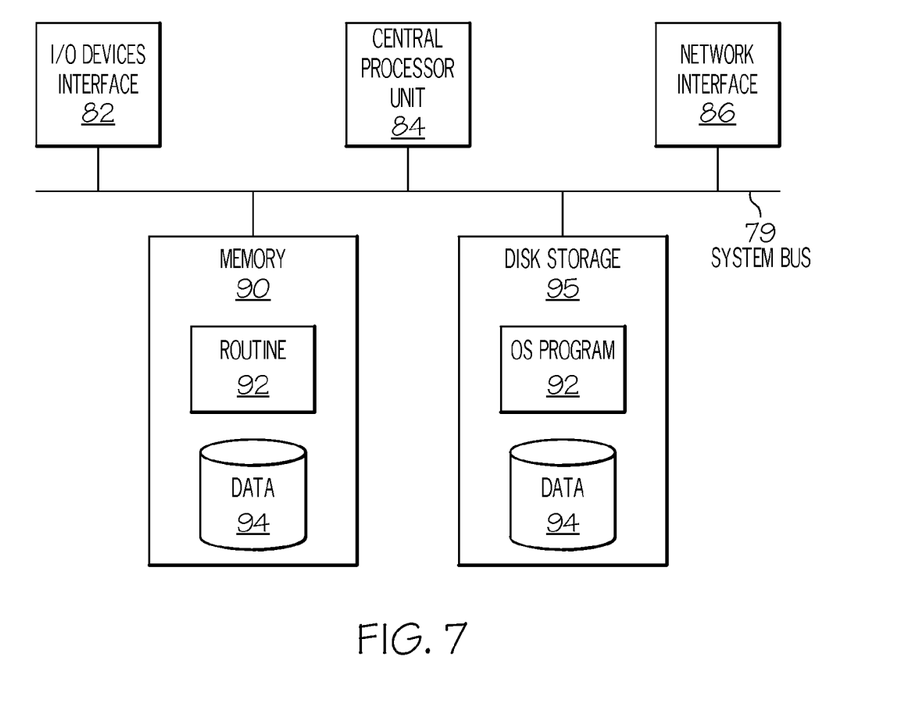
FIG. 7 is a schematic block diagram of a computer in the network of FIG. 4.

FIG. 7 is a diagram of the internal structure of a computer (e.g., computers 72, 74 or servers 76) in the computer network of FIG. 6. Each computer typically contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 6. Memory 90 provides volatile storage for computer software instructions used to implement an embodiment of the present invention. Disk storage 95 provides non-volatile storage for computer software instructions and data used to implement an embodiment of the present invention. Central processor unit 84 is also attached to system bus 79 and provides for the execution of computer instructions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. As is apparent from the foregoing description, the computer readable medium may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A method of displaying computer source code text, the source code comprising one or more classes, methods, and variables having textual names, the method comprising:
   assigning unique graphical symbols to a plurality of corresponding textual names of the classes, methods, and variables;
   replacing the plurality of textual names of the classes, methods, and variables in the source code text with the corresponding assigned unique graphical symbols; and
   displaying the source code text with the assigned unique graphical symbols in place of the corresponding textual names of the classes, methods, and variables within the displayed source code text.

2. The method of claim 1, wherein the source code comprises at least a first and a second module, wherein the method is implemented during debugging of the source code, wherein the unique graphical symbols are assigned to the corresponding textual names of the variables present in the first module, and wherein the method further comprises:
   passing the unique symbols assigned to the corresponding variables from the first module to the second module when the variables are passed from the first module to the second module, such that the second module is displayed with the assigned unique graphical symbols in place of the textual names of the variables.

3. The method of claim 1, further comprising:
   exporting a mapping of the assigned unique graphical symbols and each respective textual name to a central repository.

4. The method of claim 3, wherein the central repository provides a voting system whereby users of the central repository can rate the unique graphical symbols.

5. The method of claim 1, further comprising:
   importing a mapping of the assigned unique graphical symbols and each respective textual name from a central repository, wherein the assigning is performed based on the imported mapping.

6. The method of claim 1, wherein each graphical symbol comprises a color indicative of a property of the corresponding class, method, or variable.

7. A system displaying computer source code text, the source code comprising one or more classes, methods, and variables having textual names, the system comprising:
   a processing element configured for assigning unique graphical symbols to a plurality of corresponding textual names of the classes, methods, and variables and replacing the plurality of textual names of the classes, methods, and variables in the source code text with the corresponding assigned unique graphical symbols;
   memory for storing the assigned unique graphical symbols; and
   a display element configured for displaying the source code with the assigned unique graphical symbols in place of the corresponding textual names of the classes, methods, and variables within the displayed source code text.

8. The system of claim 7, wherein the source code comprises at least a first and a second module, wherein the processing element assigns the unique graphical symbols to the corresponding textual names of the variables in the first module, and wherein the processing element is further configured for, during debugging of the source code, passing the unique symbols assigned to the corresponding variables from the first module to the second module when the variables are passed from the first module to the second module, such that the second module is displayed on the display element with the assigned unique graphical symbols in place of the textual names of the variables.

9. The system of claim 7, wherein the processing element is further configured for exporting a mapping of the assigned unique graphical symbols and each respective textual name to a central repository.

10. The system of claim 9, wherein the central repository comprises a voting system whereby users of the central repository can rate the unique graphical symbols.

11. The system of claim 7, wherein the processing element is further configured for importing a mapping of the assigned unique graphical symbols and each respective textual name from a central repository, wherein the processing element assigns the unique graphical symbol to each textual name based on the imported mapping.

12. The system of claim 7, wherein each graphical symbol comprises a color indicative of a property of the corresponding class, method, or variable.

13. A computer program product for displaying computer source code text, the source code comprising one or more classes, methods, and variables having textual names, the computer program product comprising at least one computer-readable storage medium having computer-readable program code stored therein, the computer-readable program code comprising:

computer-usable program code for assigning unique graphical symbols to a plurality of corresponding textual names of the classes, methods, and variables;

computer-usable program code for replacing the plurality of textual names of the classes, methods, and variables in the source code text with the corresponding assigned unique graphical symbols; and     computer-usable program code for displaying the source code with the assigned unique graphical symbols in place of the corresponding textual names of the classes, methods, and variables within the displayed source code text.

14. The computer program product of claim 13, wherein the source code comprises at least a first and a second module, wherein the unique graphical symbols are assigned to the corresponding textual names of the variables in the first module, and wherein the computer program product further comprises:

computer-usable program code for, during debugging of the source code, passing the unique symbols assigned to the corresponding variables from the first module to the second module when the variables are passed from the first module to the second module, such that the second module is displayed with the assigned unique graphical symbols in place of the textual names of the variables.

15. The computer program product of claim 13, further comprising:

exporting a mapping of the assigned unique graphical symbols and each respective textual name to a central repository.

16. The computer program product of claim 15, wherein the central repository provides a voting system whereby users of the central repository can rate the unique graphical symbols.

17. The computer program product of claim 13, further comprising:

importing a mapping of the assigned unique graphical symbols and each respective textual name from a central repository, wherein the assigning is performed based on the imported mapping.

18. The computer program product of claim 13, wherein each graphical symbol comprises a color indicative of a property of the corresponding class, method, or variable.

\* \* \* \* \*